US012608472B2

(12) United States Patent
Yamakoshi et al.

(10) Patent No.: US 12,608,472 B2
(45) Date of Patent: Apr. 21, 2026

(54) DETECTION DEVICE, DETECTION METHOD, AND DETECTION PROGRAM

(71) Applicant: NTT, Inc., Tokyo (JP)

(72) Inventors: Kimihiro Yamakoshi, Musashino (JP);
Nobuhiro Chiba, Musashino (JP);
Hiroyoshi Takiguchi, Musashino (JP);
Yoshiaki Nakajima, Musashino (JP)

(73) Assignee: NTT, Inc., Tokyo (JP)

( * ) Notice: Subject to any disclaimer, the term of this
patent is extended or adjusted under 35
U.S.C. 154(b) by 134 days.

(21) Appl. No.: 18/562,847

(22) PCT Filed: May 28, 2021

(86) PCT No.: PCT/JP2021/020419
§ 371 (c)(1),
(2) Date: Nov. 21, 2023

(87) PCT Pub. No.: WO2022/249448
PCT Pub. Date: Dec. 1, 2022

(65) Prior Publication Data
US 2024/0370559 A1     Nov. 7, 2024

(51) Int. Cl.
*G06F 21/56*          (2013.01)
(52) U.S. Cl.
CPC ...... *G06F 21/565* (2013.01); *G06F 2221/034*
(2013.01)
(58) Field of Classification Search
USPC ......................................................... 726/24
See application file for complete search history.

(56) References Cited

U.S. PATENT DOCUMENTS

| | | | |
|---|---|---|---|
| 6,021,510 A | 2/2000 | Nachenberg | |
| 8,365,283 B1 | 1/2013 | Satish et al. | |
| 2007/0240222 A1 | 10/2007 | Tuvell et al. | |
| 2011/0185417 A1 | 7/2011 | Zhou et al. | |
| 2015/0261617 A1* | 9/2015 | Choi .................. | G11C 16/3418 |
| | | | 714/6.22 |
| 2017/0364702 A1 | 12/2017 | Goldfarb et al. | |
| 2018/0139056 A1* | 5/2018 | Imai .......................... | H04L 9/14 |
| 2019/0012458 A1* | 1/2019 | Fausak .................. | G06F 21/565 |
| 2019/0280925 A1* | 9/2019 | Cooper .............. | H04L 41/0816 |
| 2020/0074390 A1* | 3/2020 | Akula .................. | G06Q 10/087 |
| 2020/0080873 A1* | 3/2020 | Jackson .............. | G06F 16/2255 |

(Continued)

FOREIGN PATENT DOCUMENTS

| | | | |
|---|---|---|---|
| EP | 1 032 877 B1 | 4/2002 | |
| EP | 3451218 A1 * | 3/2019 | ........... H04L 9/3263 |

(Continued)

OTHER PUBLICATIONS

"Tripwire", Online Available at: https://www.tripwire.co.jp/about/,
Retrieved from the net on: Apr. 26, 2021, 3 pages including English
Translation.

(Continued)

*Primary Examiner* — Sakinah White-Taylor
(74) *Attorney, Agent, or Firm* — XSENSUS LLP

(57) ABSTRACT

A collation unit checks the presence/absence of alteration of
all files when an apparatus is started. A cyclic collation unit
checks the presence/absence of alteration of a predetermined
file at predetermined time intervals during the operation of
the apparatus.

5 Claims, 4 Drawing Sheets

(56)         References Cited

U.S. PATENT DOCUMENTS

| | | | | |
|---|---|---|---|---|
| 2020/0134205 A1* | 4/2020 | Hsiao | .................... | G06F 21/602 |
| 2020/0401688 A1* | 12/2020 | Michishita | .............. | G06F 21/57 |
| 2021/0149950 A1* | 5/2021 | Fourman | .............. | G06F 16/638 |
| 2021/0249145 A1* | 8/2021 | Futamura | .............. | H04L 9/3273 |
| 2022/0092199 A1* | 3/2022 | Jiang | .................. | G06F 21/6209 |
| 2022/0318385 A1* | 10/2022 | Reid | .................... | G06F 21/565 |

FOREIGN PATENT DOCUMENTS

| | | | | |
|---|---|---|---|---|
| JP | 2012-053635 | A | | 3/2012 |
| JP | 2020154705 | A | * | 9/2020 |
| WO | 2007/016478 | A2 | | 2/2007 |

OTHER PUBLICATIONS

Hayaki et al., "Proposal of reliable proof technology by falsification detection function for IoT devices", Preprints of 2020 symposium on cryptography and Information security, Jan. 2020, 20 pages including English Translation.
Yuichiro Shirai, "Linux security to secure with a tool", Nikkei Linux, vol. 7, No. 3, Feb. 10, 2005, pp. 113-120 (24 pages including English Translation).

* cited by examiner

DETECTION DEVICE, DETECTION METHOD, AND DETECTION PROGRAM

CROSS-REFERENCE TO RELATED APPLICATION

The present application is based on PCT filing PCT/JP2021/020419, filed May 28, 2021, the entire contents of which are incorporated herein by reference.

TECHNICAL FIELD

The present invention relates to a detection device, a detection method, and a detection program.

BACKGROUND ART

In general, unlike a PC, a server, or the like, since an IoT apparatus cannot use virus detection software, there are products that specialize in checking alteration of software or configuration files installed in the IoT apparatus (refer to NPL 1).

CITATION LIST

Non Patent Literature

NPL 1: "Tripwire," [online], [searched on Apr. 26, 2021], Internet <URL: https://www.tripwire.co.jp/about/>

SUMMARY OF INVENTION

Technical Problem

However, it is difficult for the prior art to efficiently check alteration of software and configuration files installed in an IoT apparatus. For example, since the calculation resources of an IoT apparatus are limited, it takes time to check alteration of all files during the operation of the apparatus, delaying detection of alteration. Therefore, by assigning a priority to the files to be checked, the checking interval for the high priority files can be shortened. However, a method of repeatedly checking alteration at a predetermined time interval is often wasteful. Further, there are no efficient methods for narrowing down targets of cyclic check.

The present invention has been made in view of the above, and an object of the present invention is to efficiently check alteration of software or a configuration file installed in an IoT apparatus.

Solution to Problem

In order to solve the foregoing problem and to achieve the object, a detection device according to the present invention includes a collation unit that checks the presence/absence of alteration of all files, and an apparatus is started, and a cyclic collation unit that checks the presence/absence of alteration of a predetermined file, at predetermined time intervals during an operation of the apparatus.

Advantageous Effects of Invention

According to the present invention, it is possible to efficiently check alteration of software or configuration files installed in an IoT apparatus.

DESCRIPTION OF EMBODIMENTS

Figure 1:
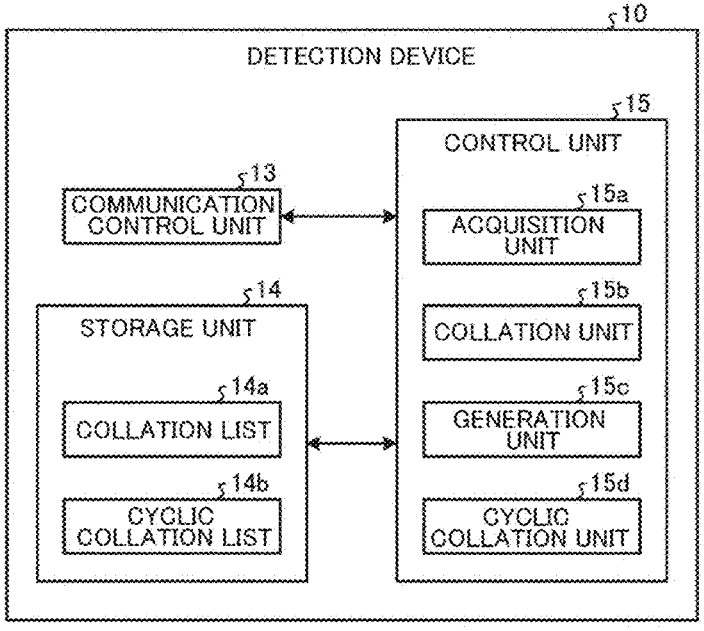
FIG. 1 is a schematic diagram illustrating a schematic configuration of a detection device.

An embodiment of the present invention will be described in detail below with reference to the drawings. Note that the present invention is not limited to the embodiment. Furthermore, the same constituent elements are denoted by the same reference numerals in the description of the drawings.

[Overview of Detection Device]

Generally, an apparatus such as an IoT apparatus that performs processing by a CPU (Central Processing Unit) includes a nonvolatile memory for storing permanent data and a volatile memory for temporarily storing data under processing. Since the volatile memory has an access speed higher than that of the nonvolatile memory, the apparatus loads a series of programs necessary for processing from the nonvolatile memory to the volatile memory at the time of start-up. A static library, a configuration file related to the apparatus and software, and the like that are contained therein are resident in the memory after once loaded into the volatile memory, and are not read again from the nonvolatile memory. Therefore, in these files, even if a file of the nonvolatile memory is altered during the operation of the apparatus, damage does not occur. Therefore, if full scanning is once performed on the entire file system at the time of starting the apparatus, it is possible to avoid damage by taking measures, such as file recovery, against the alteration detected at that time.

On the other hand, a library to be dynamically loaded such as a DLL (Dynamic Link Library) file of Windows (®) OS and a so (shared object) file of Linux (®), a configuration file to be loaded for configuration change during operation of the apparatus, and the like are loaded from the nonvolatile memory to the volatile memory at an arbitrary timing during operation of the apparatus. If these data are altered during the operation of the apparatus, there is a possibility that an actual damage may occur unless the alteration is detected before the data are loaded into the volatile memory.

Therefore, the detection device of the present embodiment checks the presence/absence of alteration of the entire file system when the apparatus is started. Also, during the operation of the apparatus, only files such as DLL which may be loaded into the volatile memory are limited to a check object, and the presence/absence of repetitive alteration is checked at fixed time intervals. Thus, the detection device can efficiently check the presence/absence of alteration by reducing a useless processing load during the operation of the apparatus.

[Configuration of Detection Device]

FIG. 1 is a schematic diagram exemplifying a schematic configuration of the detection device. A detection device 10 according to the present embodiment is incorporated in an apparatus subject to detection processing, which will be described later, and includes a communication control unit 13, a storage unit 14, and a control unit 15.

The communication control unit 13 is implemented by an NIC (Network Interface Card) or the like and controls communication between an external apparatus such as a server device that acquires and manages various information and the control unit 15 via a network. Note that the detection device 10 may be implemented in hardware different from the apparatus subject to the detection processing. In this case, the detection device 10 executes detection processing while communicating with the apparatus via the communication control unit 13.

The storage unit 14 is realized by a semiconductor memory element such as a RAM (Random Access Memory) or a flash memory, or a storage device such as a hard disk or an optical disk. The storage unit 14 stores in advance, for example, a processing program that operates the detection device 10 and data to be used during execution of the processing program, or the storage unit 14 stores the processing program and the data temporarily every time the processing is executed.

In the present embodiment, the storage unit 14 functions as a nonvolatile memory and a volatile memory of the apparatus, and stores a collation list 14a and a cyclic collation list 14b used for detection processing to be described later. Note that the storage unit 14 may also be configured to communicate with the control unit 15 via the communication control unit 13.

Here, the collation list 14a includes file identification information such as a file path of each file and correct answer information such as a hash value of each file, for all files stored in a nonvolatile memory of the apparatus, and is generated in advance prior to the detection processing. The cyclic collation list 14b is generated by a generation unit 15c to be described later.

The control unit 15 is implemented by using a CPU or the like, and executes a processing program stored in a memory. Thus, as illustrated in FIG. 1, the control unit 15 functions as an acquisition unit 15a, a collation unit 15b, the generation unit 15c, and a cyclic collation unit 15d.

These functional units may be implemented in different hardware components. For example, the generation unit 15c may be mounted on a server device outside the detection device 10. In this case, as described later, the generation unit 15c acquires a file read log during operation of the apparatus via the communication control unit 13, and stores the generated cyclic collation list 14b in the storage unit 14 via the communication control unit 13.

The control unit 15 may also include another functional unit. The control unit 15 of the present embodiment has a functional unit for controlling the operation of the apparatus.

The acquisition unit 15a acquires a hash value of each file used for processing of the collation unit 15b and the cyclic collation unit 15d to be described later, for a file subject to the detection processing to be described later, the file being present in a nonvolatile memory of the apparatus. The acquisition unit 15a acquires the file read log from the nonvolatile memory from the apparatus.

The collation unit 15b checks the presence/absence of alteration of all files when the apparatus is started. Specifically, the collation unit 15b uses a hash value of a file to check the presence/absence of the alteration of the file. For example, the collation unit 15b checks the presence/absence of alteration by collating the hash value of the file of the nonvolatile memory of the apparatus with the hash value of the collation list 14a, with the hash value of the file being correct answer information.

When the alteration is detected, for example, the collation unit 15b stops the start of the apparatus, and takes measures such as limiting the loading of the file to the volatile memory. Thus, the occurrence of actual damage can be avoided.

The generation unit 15c generates the cyclic collation list 14b which is a list of files read from the nonvolatile memory during operation of the apparatus by using a file read log from the nonvolatile memory of the apparatus in a predetermined period after the start of the apparatus.

Figure 2:
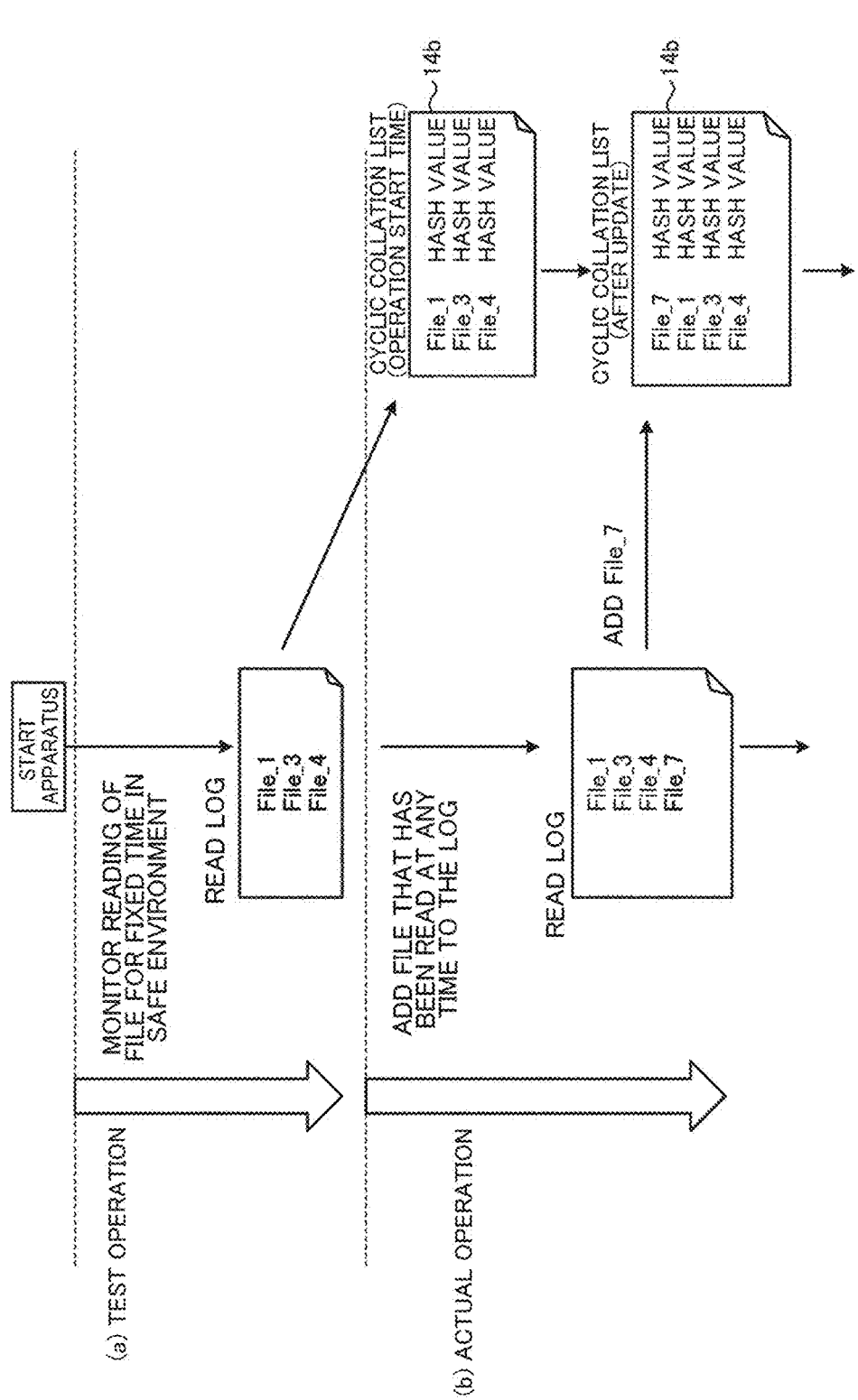
FIG. 2 is a diagram for explaining processing of a generation unit.

FIG. 2 is a diagram for explaining the processing of the generating unit. As shown in FIG. 2(a), the generation unit 15c monitors file reading from the nonvolatile memory at a fixed time during operation of the apparatus in a safety environment of test operation, lists files of the read logs, and generates the cyclic collation list 14b. The cyclic collation list 14b associates the file path of each file with the hash value as described above. In the example shown in FIG. 2(a), File_1, File_3, and File_4 are listed as the file paths, from the read logs of the files.

In this manner, the generation unit 15c creates a list of files as targets for alteration checking by limiting the files to files such as DLL which may be loaded into the volatile memory during the operation of the apparatus. For example, a demon program which is resident in the volatile memory and continues to operate from the start of the apparatus to the power-off, and a dynamic link type DLL which is loaded from the nonvolatile memory in linkage with the start of the main program when the power of the apparatus is turned on, are excluded from the targets for alteration checking. Then, dynamically loaded DLLs such as plug-ins that are dynamically loaded into memory at arbitrary times after the main program is started are listed as targets for alteration checking.

Furthermore, the generation unit 15c monitors a read log of a file from the nonvolatile memory during the operation of the apparatus, and adds a file not in the cyclic collation list 12b. For example, as shown in FIG. 2(b), the generation unit 15c monitors the read log during actual operation of the apparatus, and when a file not listed in the existing cyclic collation list 14b is included in the read log, the generation unit 15c adds the file path and the hash value of the file to the cyclic collation list 14b. In this manner, the generation unit 15c updates the targets of alteration checking at any time. In the example shown in FIG. 2(b), a File_7 is added to the updated cyclic collation list 14b as a file path.

Let us return to the explanation of FIG. 1. The cyclic collation unit 15d checks the presence/absence of alteration of a predetermined file at predetermined time intervals during the operation of the apparatus. Specifically, the cyclic collation unit 15d checks the presence/absence of alteration of a file described in the generated cyclic collation list 14b. The cyclic collation unit 15d checks the presence/absence of the alteration of the file by using the hash value of the file.

In this manner, the detection device 10 excludes a file, such as a demon program and a dynamic link type DLL, which can avoid the occurrence of actual damage by performing alteration check once at the time of starting the apparatus, and limits the file to a small number of dynamic libraries or the like, to repeat the alteration check during the operation of the apparatus. Thus, the processing load is reduced, the influence on the original operation of the apparatus is minimized, and the file alteration can be efficiently checked.

The cyclic collation unit 15d may preferentially check the presence/absence of alteration of the file added to the cyclic collation list 14b. For example, at the time of updating the cyclic collation list 14b, a newly added file is added to the head line of the cyclic collation list 14b, to execute alteration checking in the shortest time.

When the alteration is detected, the cyclic collation unit 15d takes a measure such as limiting the load to the volatile memory, for example. Thus, the occurrence of actual damage can be avoided.

Since the generation unit 15c is built in the apparatus, files that are the objects of alteration checking can be narrowed down even in an off-line environment.

[Detection Processing]

Figure 3:
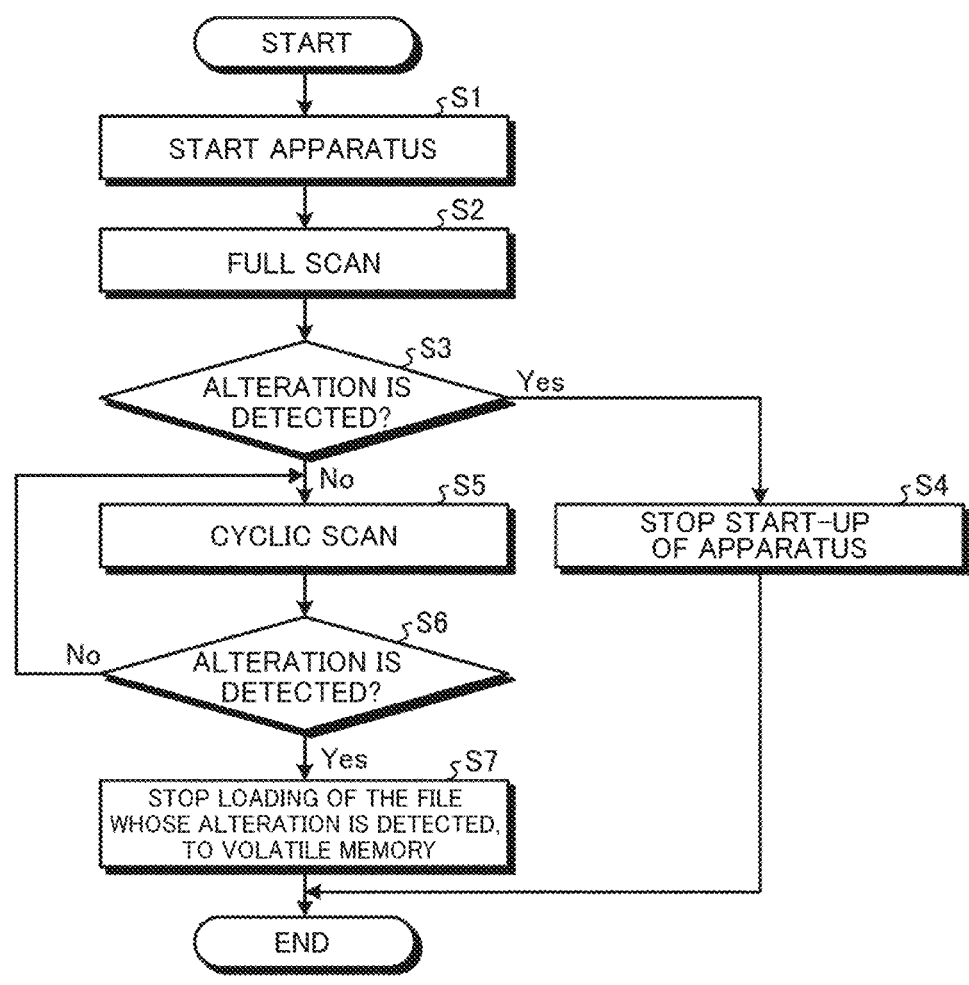
FIG. 3 is a flowchart illustrating a detection processing procedure.

Next, the detection processing by the detection device 10 according to the present embodiment will be described with reference to FIG. 3. FIG. 3 is a flowchart showing a detection processing procedure. The flowchart shown in FIG. 5 starts at a timing at which an operation input instructing the start of the detection processing, for example.

First, at the time of starting the apparatus (step S1), the collation unit 15b performs full scan for checking the presence/absence of alteration for all files (step S2). The collation unit 15b then stops the start of the apparatus (step S4) when the alteration is detected (step S3, Yes), to end the series of detection processing.

On the other hand, when there is no alteration (step S3, No), the cyclic collation unit 15d performs collation scan for checking the presence/absence of alteration, for a file described in the cyclic collation list 14b (step S5). When there is no alteration (step S6, No), the cyclic collation unit 15d repeats the cyclic scan of step S5 at predetermined time intervals.

On the other hand, when the alteration is detected (step S6, Yes), the cyclic collation unit 15d takes a measure such as stopping loading to the volatile memory (step S7). In this manner, the series of detection processing ends.

EFFECTS

As described above, in the detection device 10 of the present embodiment, when the apparatus is started, the collation unit 15b checks the presence/absence of alteration of all files. The cyclic collation unit 15d checks the presence/absence of alteration of the predetermined file, at predetermined time intervals during the operation of the apparatus.

Specifically, the generation unit 15c generates the cyclic collation list 14b of a file read from the nonvolatile memory of the apparatus during operation thereof, by using a file read log from the nonvolatile memory of the apparatus in a predetermined period after the start of the apparatus. The cyclic collation unit 15d checks the presence/absence of alteration of the file described in the generated cyclic collation list 14b. In addition, the collation unit 15b and the cyclic collation unit 15d check the presence/absence of alteration of the file by using the hash value of the file.

In this manner, the detection device 10 excludes a file, such as a demon program and a dynamic link type DLL, which can avoid the occurrence of actual damage by performing alteration check once at the time of starting the apparatus, and limits the file to a small number of dynamic libraries or the like, to repeat the alteration check during operation of the apparatus. Thus, the wasteful consumption of the limited CPU and resources of the apparatus can be reduced, and the impact on the original operation of the apparatus can be minimized, allowing for efficient checking of file alteration.

In particular, it is assumed that software required at the time of starting the apparatus is automatically started in the IoT apparatus, and that the software loaded in the volatile memory remains resident and continues to operate until the power of the apparatus is turned off. Therefore, the target files for alteration check are narrowed down to a small number of pieces of software or libraries read during operation, and the impact on the original operation of the IoT apparatus can be minimized. Therefore, the detection device 10 can efficiently check alteration of software and a configuration file installed in the IoT apparatus.

Further, the generation unit 15c monitors a read log of a file from the nonvolatile memory during the operation of the apparatus, and adds a file not in the cyclic collation list 14b. Thus, the detection device 10 can efficiently generate the cyclic collation list 14b and efficiently check for alteration.

The cyclic collation unit 15d preferentially checks the presence/absence of alteration of the file added to the cyclic collation list 14b. Thus, the detection device 10 can execute the alteration check in the shortest time.

[Program]

It is also possible to create a program describing processing to be executed by the detection device 10 according to the above embodiment in a language executable by a computer. In one embodiment, the detection device 10 can be implemented by installing a detection program for executing the above-described detection processing as package software or online software in a desired computer. For example, by causing an information processing device to execute the detection program, the information processing device can be caused to function as the detection device 10. The information processing device can be a desktop type or laptop type personal computer. In addition, the information processing device can be a mobile communication terminal such as a smartphone, a mobile phone and a PHS (Personal Handyphone System) or a slate terminal such as a PDA (Personal Digital Assistant). The function of the detection device 10 may be implemented by a cloud server.

Figure 4:
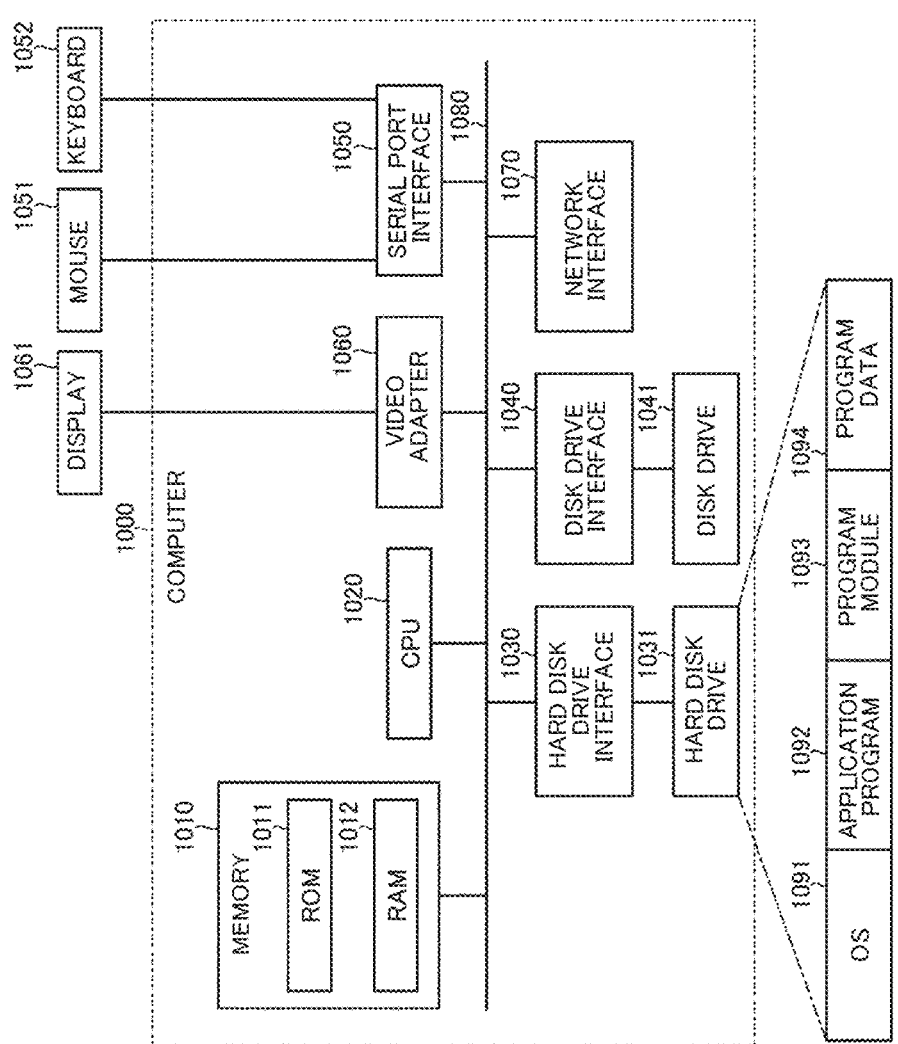
FIG. 4 is a diagram illustrating a computer that executes a detection program.

FIG. 4 is a diagram illustrating an example of a computer that executes the detection program. A computer 1000 has a memory 1010, a CPU 1020, a hard disk drive interface 1030, a disk drive interface 1040, a serial port interface 1050, a video adapter 1060, and a network interface 1070, for example. These units are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1031. The disk drive interface 1040 is connected to a disk drive 1041. A removable storage medium such as a magnetic disk or an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each of the tables described in the foregoing embodiment is stored in, for example, the hard disk drive 1031 or the memory 1010.

The detection program is stored in the hard disk drive 1031 as the program module 1093 in which commands executed by the computer 1000 are described, for example. Specifically, the program module 1093 describing each processing to be executed by the detection device 10 described in the embodiment described above is stored in the hard disk drive 1031.

The data used for information processing by the detection program is stored in the hard disk drive 1031, for example, as the program data 1094. Thereafter, the CPU 1020 reads the program module 1093 and the program data 1094 stored in the hard disk drive 1031 into the RAM 1012 when necessary, and executes each of the procedures described above.

Note that the program module 1093 and program data 1094 related to the detection program are not limited to being stored in the hard disk drive 1031, and may also be stored in, for example, a removable storage medium and read out by the CPU 1020 via the disk drive 1041, or the like. Alternatively, the program module 1093 and the program data 1094 related to the detection program may be stored in another computer connected via a network such as a LAN (Local Area Network) or WAN (Wide Area Network) and may be read by the CPU 1020 via the network interface 1070.

Although the embodiments to which the invention made by the inventor thereof is applied have been described above, the present invention is not limited by the descriptions and drawings forming a part of the disclosure of the present invention according to the embodiments. That is to say, other embodiments, examples, operation techniques, and the like made by those skilled in the art on the basis of the present embodiment are all included in the scope of the present invention.

REFERENCE SIGNS LIST

10 Detection device
13 Communication control unit
14 Storage unit
14a Collation list
14b Cyclic collation list
15 Control unit
15a Acquisition unit
15b Collation unit
15c Generation unit
15d Cyclic collation unit

The invention claimed is:

1. A detection device, comprising:

a memory; and a processor coupled to the memory and programmed to execute a process to:

first check presence/absence of alteration of all files when an Internet-Of-Things (IOT) hardware is started;

second check the presence/absence of alteration of a predetermined file at predetermined time intervals during an operation of the IOT hardware;

generate a list of files to be read from a nonvolatile memory of the IOT hardware during the operation of the IOT hardware by using a file read log from the nonvolatile memory of the IOT hardware in a predetermined period after the IOT hardware is started; and monitor the file read log from the nonvolatile memory during the operation of the IOT hardware, and add a file that is not in the list, wherein the second check includes check the presence/absence of alteration of a file described in the generated list, and the monitor includes monitor the file read log during actual operation of the IOT hardware, and when a file not listed in the list is included in the file read log, add a file path and a hash value of the file to the list.

2. The detection device according to claim 1, wherein the second check preferentially checks the presence/absence of alteration of the file added to the list.

3. The detection device according to claim 1, wherein the first check and the second check of the presence/absence of alteration of the file is by using a hash value of the file.

4. A detection method executed by a detection device, the detection method comprising:

a collation step of checking presence/absence of alteration of all files when an IOT hardware is started;

a cyclic collation step of checking the presence/absence of alteration of a predetermined file at predetermined time intervals during an operation of the IOT hardware;

generating a list of files to be read from a nonvolatile memory of the IOT hardware during the operation of the IOT hardware by using a file read log from the nonvolatile memory of the IOT hardware in a predetermined period after the IOT hardware is started; and monitoring the file read log from the nonvolatile memory during the operation of the IOT hardware, and add a file that is not in the list, wherein the cyclic collation step includes checking the presence/absence of alteration of a file described in the generated list, and the monitoring includes monitoring the file read log during actual operation of the IOT hardware, and when a file not listed in the list is included in the file read log, adding a file path and a hash value of the file to the list.

5. A non-transitory computer-readable recording medium having stored a detection program for causing a computer to execute:

a collation step of checking presence/absence of alteration of all files when an IOT hardware is started;

a cyclic collation step of checking the presence/absence of alteration of a predetermined file at predetermined time intervals during an operation of the IOT hardware;

generating a list of files to be read from a nonvolatile memory of the IOT hardware during the operation of the IOT hardware by using a file read log from the nonvolatile memory of the IOT hardware in a predetermined period after the IOT hardware is started; and monitoring the file read log from the nonvolatile memory during the operation of the IOT hardware, and add a file that is not in the list, wherein the cyclic collation step includes checking the presence/absence of alteration of a file described in the generated list, and the monitoring includes monitoring the file read log during actual operation of the IOT hardware, and when a file not listed in the list is included in the file read log, adding a file path and a hash value of the file to the list.

* * * * *